(1) Aceton Fractionation Step (P-A-1)

(2) Ethanol Fractionation Step (P-A-2)

Ammonium Sulfate Fractionation Step (New substance)

United States Patent Office 3,178,349
Patented Apr. 13, 1965

3,178,349
PHYSIOLOGICALLY ACTIVE PROTEINIC SUBSTANCE AND METHOD OF PREPARING SAME FROM ANIMAL SALIVARY GLANDS
Yosoji Ito and Shinkichi Niinobe, Tokyo, and Hideichi Asano, Yokohama, Japan, assignors to Teikoku Hormone Manufacturing Co., Ltd., Tokyo, Japan, a corporation of Japan
Filed Dec. 5, 1960, Ser. No. 73,843
Claims priority, application Japan, Jan. 23, 1960, 35/1,755
2 Claims. (Cl. 167—74)

This invention relates to a new, physiologically active substance and the preparation thereof. More particularly this invention is concerned with a method for the separation of a new, physiologically active substance from cattle salivary glands in general.

The new substance of the present invention shows physiologically high activity, i.e., that for depressing calcium level in blood serum and that for increasing leukocyte number in circulating blood, and it is useful for the treatment of myasthenia.

Accordingly an object of the present invention is to provide a new, physiologically active substance valuable as medicine. Another object of the invention is to provide a method for the preparation of the substance from cattle salivary glands. Other objects and advantages comprehended by the invention will be apparent from the description and claims which follow.

Figure 1:
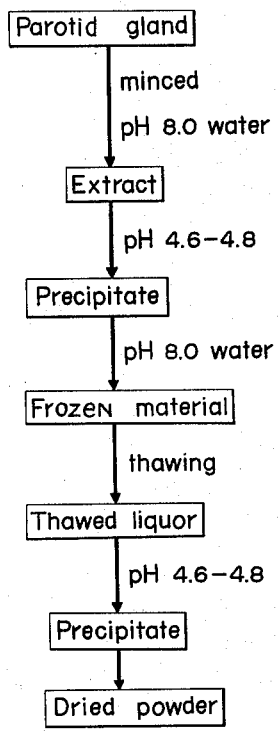
Figure 3:
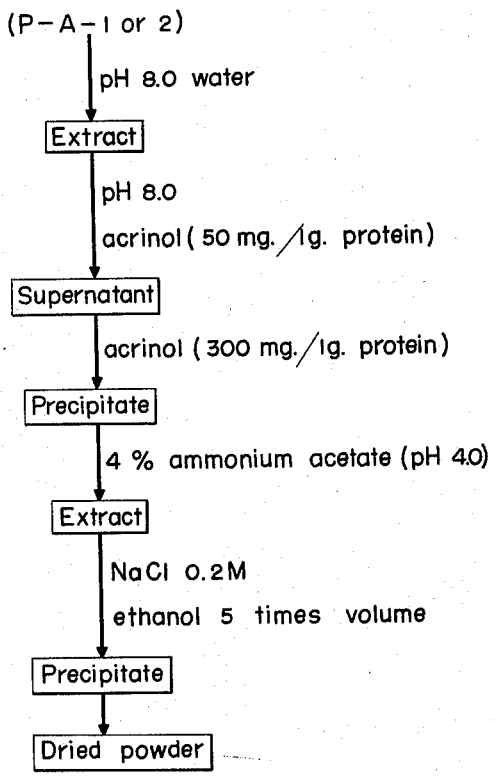
Figure 2:
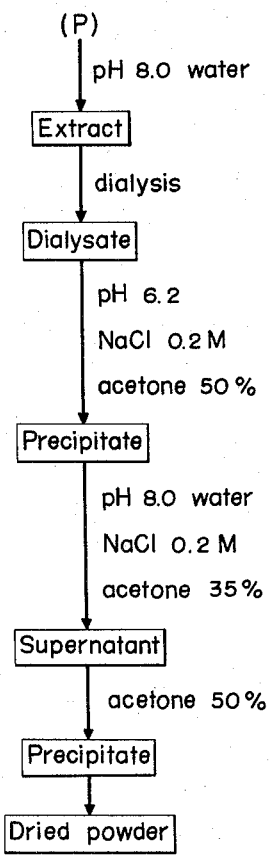
Figure 2:
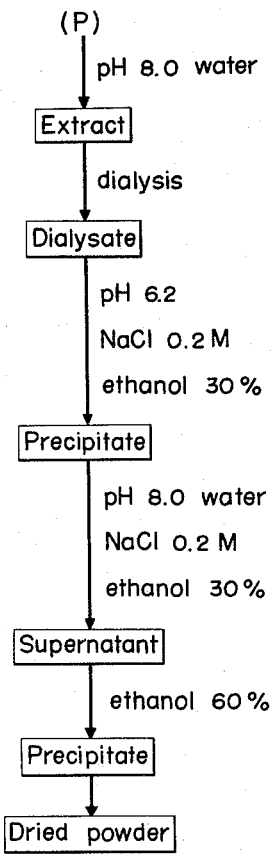
Figure 4:
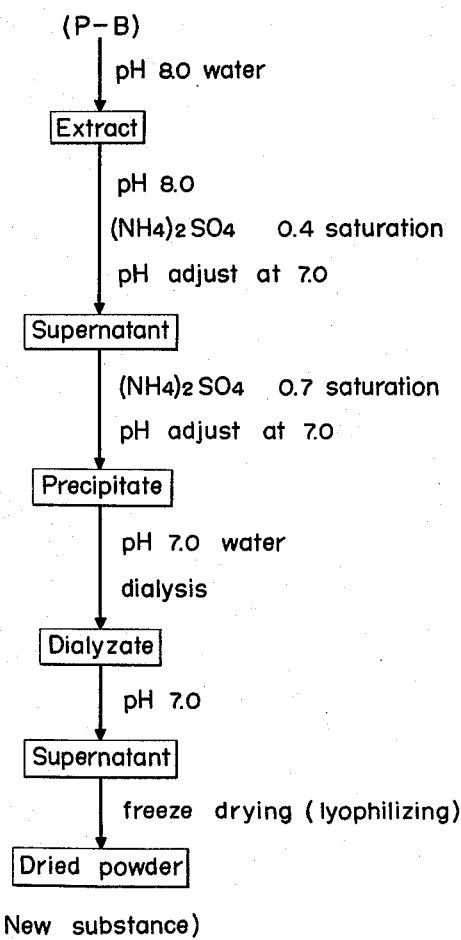
Figure 5:
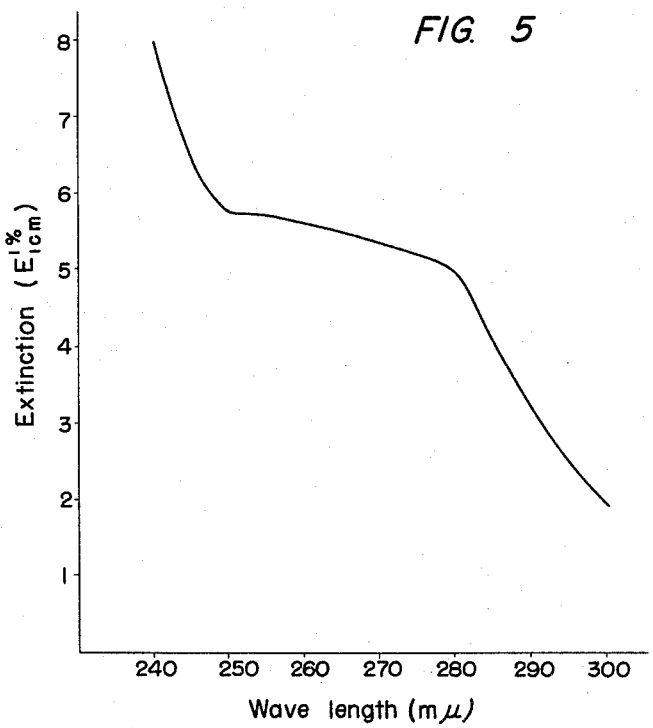
Figure 6:
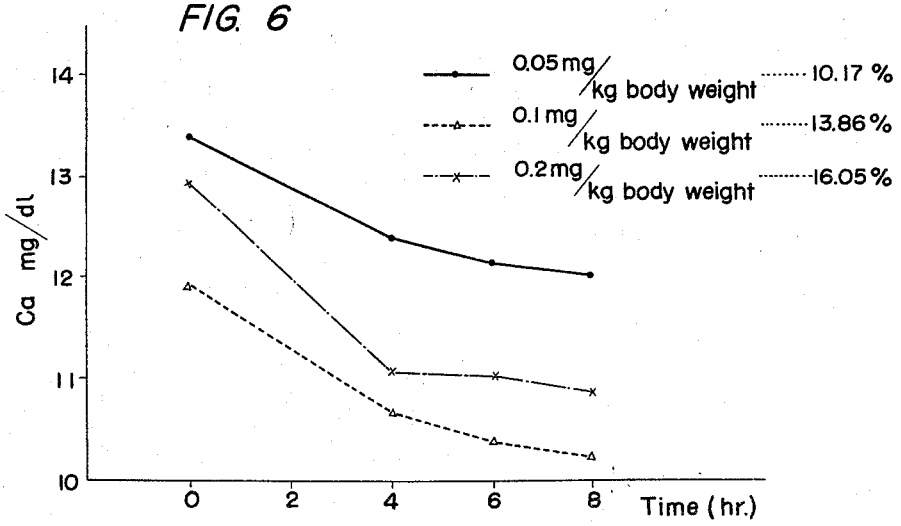
Figure 7:
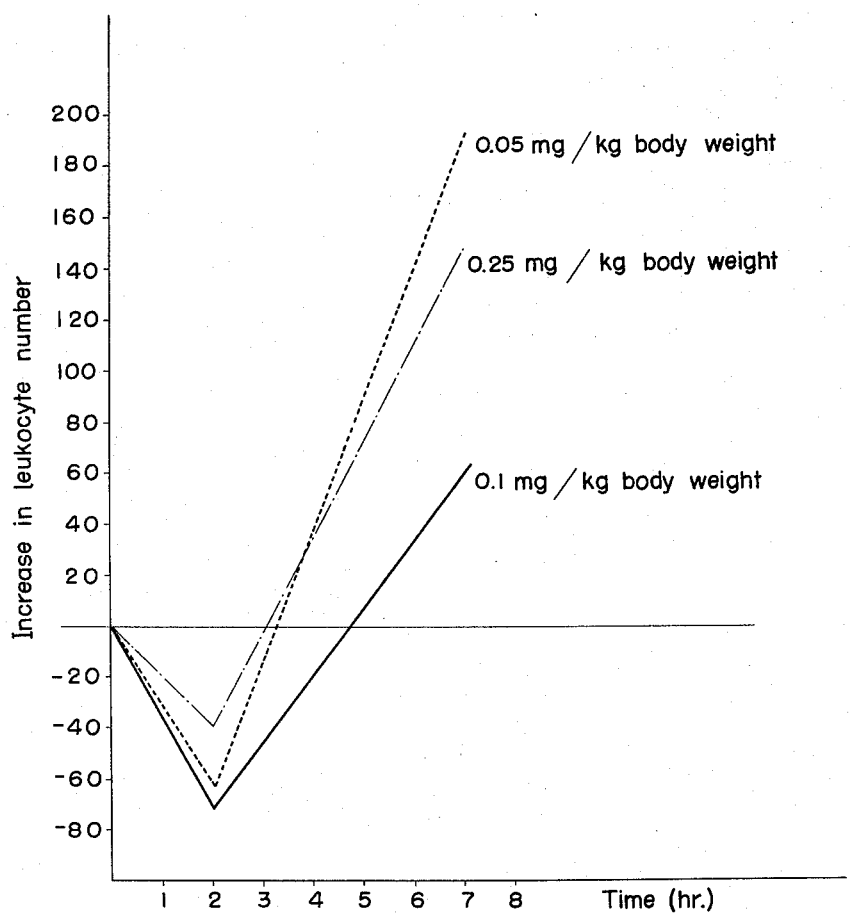

In the accompanying drawings, FIG. 1 is a flow diagram showing the freezing and thawing step of a method of the present invention. FIG. 2 is a flow diagram showing acetone or ethanol fractionation step and FIG. 3 is a flow diagram showing the acrinol precipitation step. FIG. 4 is also a flow diagram showing the ammonium sulfate fractionation step. FIG. 5 is UV-absorption spectrum of a new substance obtained in the present invention. FIG. 6 and FIG. 7 respectively show the relationship between the dose of the new substance and the depression of blood serum calcium level and between that dose and the leukocyte number in circulating blood, when the said substance is intravenously administered to rabbits.

In the general form of the present invention, a new physiologically active substance can be obtained by extracting a minced cattle parotid gland with water at pH 8.0; adjusting the hydrogen ion concentration of the extract to effect precipitation at the isoelectric point; extracting the resultant precipitate with water at pH 8.0; freezing and then thawing the extract; adjusting the hydrogen ion concentration of the resulting clear thawed liquor to effect precipitation of effective component at the isoelectric point; washing the resulting precipitate with acetone to have acetone-dried powder; extracting the dried powder with water at pH 8.0; and then fractionating the extract with water-immiscible organic solvent, i.e., acetone or ethanol and then acrinol and finally ammonium sulfate.

In accordance with the present invention, thus the new, physiologically active substance is prepared or separated in pure form from cattle parotid gland by the combination of the following steps, namely; the formation of dried powder from the parotid gland by precipitation at the isoelectric point (the 1st step); the fractionation purification using acetone or ethanol (the 2nd step); the precipitation purification using acrinol (the 3rd step); and the ammonium sulfate fractionation purification (the 4th step).

Acrinol has the formula

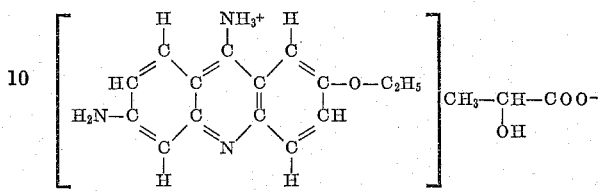

which can be hydrated with one mole of water of crystallization (Pharmacopoeia of Japan, 6th Edition (1951)).

Now the present invention will be described in details with respect to the individual steps.

(1) Freezing and thawing step

Frozen ox parotid gland is minced using a food cutter for 15 minutes. There is added water amounting 5 to 6 times as that of the starting material, and then with stirring, caustic soda is added thereto to have a pH of 8.0. Thereafter the extraction with stirring is continued for 3 hours. The extract is separated by centrifugal separation and hydrochloric acid is added thereto with stirring so as to have a pH of 4.6 to 4.8. Thereafter the resultant solution is left standing overnight. The precipitate is collected by centrifugal separation and added with water amounting about 5 times as the amount of said precipitate. With stirring, caustic soda is added thereto to make the solution pH 8.0, and then the extraction with stirring is effected for 3 hours. The extract, together with insoluble materials suspended therein, is poured separately into butts and left standing for at least 17 hours in a freezing chamber (below —15° C.) to freeze it completely. Then the frozen material is warmed up to 20°±2° C. and, while gradually thawing, filtered through gauze. To the resulting thawed liquor, hydrochloric acid is added to have a pH of 4.6–4.8 and the resulting mixture is left standing overnight. The precipitate is collected by centrifugal separation and washed with acetone. After suction filtration using a suction funnel and entire removal of acetone, the precipitate is dried under reduced pressure. Yield calculated on the amount of ox parotid gland used is 0.3–0.5%.

(2)-1 Acetone fractionation step

To the dry powder obtained in (1), water amounting 50 times as the amount of said powder is added, and with stirring under ice-cooling conditions (below —10° C.), caustic soda is added thereto to adjust a pH at 8.0. Thereafter the extraction is effected for 3 hours while stirring. Insoluble materials are removed by centrifugal separation and the supernatant is subjected to dialysis against flowing water overnight. After adjusting at a pH of 6.2, the solution inside the dialysis membrane is added with sodium chloride to have the concentration of 0.2 M and thereafter, while stirring under ice-cooling conditions (below —10° C.), added with acetone dropwise to have the concentration of 50%. The precipitate formed is collected by centrifugal separation and added with water amounting 100 times as that of said precipitate. With stirring the solution under ice-cooling condition, N/10 caustic soda is added to make the solution pH 8.0, and thereafter sodium chloride is also added thereto to have the sodium chloride concentration of 0.2 M. To the solution while stirred, acetone is added dropwise to have the acetone concentration of 35%. The separated precipitate (which is ineffective) is removed by centrifuge and the supernatant is further added with acetone dropwise to make the acetone concentration up to 50%. The separated precipitate is collected by centrifugal separation and washed with acetone and ether and then dried in vacuo. Yield calculated on the basis of the dry powder of (1) is about 6–9%. Through these purification procedures, the efficiency for decreasing blood serum calcium level of rabbit is increased 8 times.

(2)–2 *Ethanol fractionation step*

To the dry powder obtained in (1), water amounting 50 times as the amount of said powder is added and, with stirring under ice-cooling (below —10° C.), caustic soda is added thereto to adjust the pH to 8.0. Thereafter extraction is effected for 3 hours while stirring. Insoluble materials are removed by centrifugal separation and the supernatant is subjected to dialysis against flowing water overnight. After adjusting at a pH of 6.2, the solution inside the dialysis membrane is added with sodium chloride to have the concentration of 0.2 M and then ethanol is added dropwise to have the concentration of 60%. The formed precipitate is collected by centrifugal separation and then added with water amounting 100 times. To this solution while stirred under ice-cooling (below —10° C.), N/10 caustic soda is added to have the pH of 8.0 and then sodium chloride is added to have the concentration of 0.2 M. With stirring, ethanol is added dropwise to the solution to have the ethanol concentration of 60%. The separated precipitate is collected by centrifuge and washed with ethanol and then ether and therafter dried in vacuo. Yield as calculated on the basis of the dry powder of (1) is about 5–8%. Through these precipitation procedures, the activity for decreasing blood serum calcium level is increased up to 8 times.

As organic solvent, methanol, dioxane, Cellosolve, etc., were used in place of acetone or ethanol. But these solvents are insufficient in their fractionating power and only provide unsatisfactory result for purification. By comparison acetone and ethanol are both approximately similarly effective for purification, but acetone is superior to ethanol in yield and with respect to the subsequent purification operations.

(3) *Acrinol purification step*

To the material obtained in the acetone fractionation step of (2)–1, water amounting to 50 times the amount of said material is added and then, while stirring under ice-cooling (—10° C.), N/10 caustic soda is added to make the solution pH 8.0. Thereafter extraction with stirring is effected for 30 minutes. Insoluble material is removed by centrifugal separation, and acrinol is added in amount of 50 mg. per one gram of protein to the supernatant. The separated precipitate (being ineffective) is removed by centrifuge, and to the resulting supernatant acrinol is additionally added in amount of 300 mg. per one gram of protein. The resulting precipitate is extracted with 4% ammonium acetate (pH=4.0) amounting 10 times amount. The extract is separated by centrifuge and then added with ethanol amounting 5 times amount. The separated precipitate is collected by centrifuge and then washed with ethanol until yellow color of acrinol disappears, and thereafter it is dried on ether. The yield as calculated on the basis of the material of the acetone fractionation step is about 30–40%. Through these purification procedures, the activity for decreasing blood serum calcium is raised twice.

(4) *Ammonium sulfate fractionation step*

To the acrinol-purified product of (3), water amounting to 100 times that of said product is added and then, while stirring under ice-cooling, N/10 caustic soda is added to have the solution at a pH of 8.0. Thereafter extraction is effected with stirring for 30 minutes. Insoluble materials are removed by centrifugal separation and the supernatant is added with ammonium sulfate to have 0.4 saturation. After ascertaining the pH of 7.0 by ammonia, the separated precipitate (being effective) is removed by centrifugal separation, and the supernatant is further added with ammonium sulfate to have 0.7 saturation. The separated precipitate is collected by centrifuge. The collected precipitate is dissolved in a small amount of water and then subjected to dialysis against flowing water for two days and then against distilled water for two days. After completing the dialysis, the solution inside the dialysis membrane is adjusted at a pH of 7.0. The separated precipitate is removed, and the obtained clear solution is lyophilized. Through the purification procedures, the activity for decreasing blood serum calcium is strengthened 2.5 times. The yield calculated on the basis of the acrinol-purified product is 10–15%.

The overall yield of the desired substance is 0.001% by weight as calculated from the weight of ox parotid gland used.

Now the physiological activity of the substance thus obtained will be mentioned hereinunder. The term "minimum effective dose" used herein means the minimum dose required for decreasing the blood serum calcium content by 12–15% five to seven hours after intravenous injection of the substance to rabbit, or that required for decreasing the leukocyte number of circulating blood by more than 50% two hours after the said injection, while the decreased leukocyte number is raised again up to original value or more higher seven hours later.

(1) Physiological properties:
   (a) Decrease of blood serum calcium level of rabbit—By the intravenous injection of 0.1 mg./kg. weight of rabbit, the blood serum calcium level immediately starts to decrease. Six to eight hours after, the calcium level reaches minimum and thereafter gradually arises. Twenty four hours after, it becomes normal value again.
   (b) Increase in leukocyte number in circulating blood of rabbit—To hours after the intravenous injection of 0.1 g. of the substance per one kilogram of body weight of rabbit, the leukocyte number in circulating blood of the rabbit rapidly decreases (by about 50–70%). After 4 hours, it becomes original level and thereafter gradually increases up to two or three times (200–300%) after 7–12 hours.
   (c) Toxicity—
   To rat, the substance is subcutaneously administered at the dose of 50 mg. once or subcutaneously continuously administered at the dose of 1 mg. once per day for ten days, during while body weight is measured and liver, spleen, kidney, suprarenal, etc. are examined. No extraordinary change is observed as compared with those of the control, The intraperitoneal injection of the substance to mice at the dose of 1.0 mg. or 2.0 mg. per head does not cause any extraordinary change in internal organs.

The intravenous injection of the substance to rabbits at the dose of 10 mg. or 50 mg. per head does not cause any extraordinary change in internal organs.

Now the physical and chemical properties of the substance of the present invention will be mentioned hereinunder.

(2) Physical and chemical properties:
   (a) Isoelectric point—pH=3.0–3.5.
   (b) Elementary analysis—C, 45.04%; N, 13.15%; P, 0.4%; H, 6.77%; S, 0.71%.
   (c) UV-absorption spectrum—There is no maximum absorption within the range of from 240 to 300 m$\mu$. (See FIG. 5.)
   (d) Constituent amino acids—Glycine, alanine, valine, leucine, phenylalanine, aspartic acid, glutamic acid, arginine, lysine, histidine, cystine, methionine, serine, threonine, proline, tryptophane, tyrosine.
   (e) Constituent saccharide—Galactose, galactosamine.
   (f) Reactions with various reagents—The present substance shows the same coloring or precipitation reactions as those for protein.
   (g) Stability—When the present substance is prepared as aqueous solution, it can be preserved at a pH of 7.6 in an ice box for 18 hours. But the solution if maintained at room temperatures loses its effectiveness either at strongly acidic site (pH=1.08) or strongly alkaline site (pH=12.0) and becomes approximately invalid within a period of 17 hours. At 40° C. and at a pH of 7.6, the activity of the solution does not change even after 18 hours, but under strongly acidic or alkaline condition, that activity is remarkedly released within a period of two hours. At boiling temperatures, the activity completely disappears within a period of 30 minutes.

The following table will serve to show the distinguished properties of the present substance as compared with parotin and saliva parotin both of which are heretofore known.

stituent sugar group consisting of galactose and galactosamine; and which substance has the UV-spectrum shown in FIGURE 5 of the accompanying drawings, showing no maximum absorption within the range of the wave length of from 240 m$\mu$ to 300 m$\mu$, prepared by a process wherein isolated salivary gland is extracted with water at pH 8.0, followed by the steps of adjusting the hydrogen ion concentration of the extract to effect precipitation at the isoelectric point; extracting the resultant precipitate with water at pH 8.0; freezing and then thawing the extract; adjusting the hydrogen ion concentration of the resulting clear thawed liquor to effect precipitation of effective component at the isoelectric point; and subjecting the resulting precipitate to fractionation to recover pure $\alpha$-parotin.

2. A method of preparing a physiologically active substance which comprises extracting a minced cattle salivary gland with water at pH 8.0, adjusting the extract at a pH of 4.6–4.8, extracting the formed precipitate with water at pH 8.0, freezing and then thawing the extract, adjusting the obtained thawed liquor at a pH of 4.6–4.8, drying the resulting precipitate with acetone, extracting the acetone-dried powder with water at pH 8.0, subjecting the extract to dialysis, adjusting at a pH of 6.2 the dialysate to which is in turn added sodium chloride to have the sodium chloride concentration of 0.2 M and then one solvent selected from the group consisting of acetone and ethanol to have the concentration of 50–60%, adding to the solution water to a pH of 8.0, sodium chloride in amount to have the NaCl concentration of 0.2 M and the same solvent in amount to have the solvent concentration of 30–35%, adding to the resultant supernatant the same solvent to have the solvent concentration of 50–60%, drying the resulting precipitate with ether, extracting the ether-dried powder with water at pH 8.0, adjusting the extract at a pH of 8.0 and then adding acrinol thereto, recovering the supernatant and adding acrinol thereto, extracting the formed precipitate with 4% ammonium acetate solution at a pH of 4.0, adding to the extract sodium chloride and ethanol, drying the resulting precipitate in vacuo, extracting the dried powder with water at pH 8.0, treating the extract with ammonium sulfate to 0.4 saturation and then adjusting the obtained saturated solution at a pH of 7.0, treating the supernatant recovered with ammonium sulfate to 0.7 saturation and adjusting the saturated solution at pH 7.0, collecting the formed precipitate and dissolving it into water at pH 7.0, subjecting the resulting solution to dialysis, adjusting the dialysate at pH 7.0, recovering the supernatant and then lyophilizing it thereby obtaining the desired substance in pure form.

|  | Parotin | Saliva parotin | New substance |
|---|---|---|---|
| Isoelectric point | pH=5.7 | pH=5.4–5.6 | pH=3.0–3.5. |
| Elementary analysis | C=50.84% | C=46.62% | C=45.04%. |
|  | H=7.31% | H=6.99% | H=6.77%. |
|  | N=14.53% | N=15.21% | N=13.15%. |
|  | S=0.77% | S=nil | S=0.71%. |
| UV-spectrum, max. absorption | 277±0.5 m$\mu$ | 277.5±0.5 m$\mu$ | None. |
| Electrophoresis | Homogeneous (pH=8.0, phosphate buffer). | Homogeneous (pH=8.6, Veronal buffer). | Homogeneous (pH=8.6, Veronal buffer). |
| Constituent amino acids | Glycine, alanine, valine, leucine, phenylalanine, aspartic acid, glutamic acid, arginine, lysine, histidine, cystine, methionine, serine, threonine, proline, tryptophane, tyrosine. | Glycine, alanine, valine, leucine, phenylalanine, aspartic acid, glutamic acid, arginine, lysine, hystidine, serine, proline, tryptophane, tyrosine. | Same as in parotin. |
| Stability to heat | Unstable | Stable | Unstable. |
| Stability to acid and alkali | ----do---- | ----do---- | Unstable to acid, but relatively stable to alkali. |
| Constituent sugar | Mannose, 0.47–0.79% |  | Galactose (13.5%), galactosamine (2.5%). |
| Minimum effective dose for reducing rabbit's serum calcium level. | 1.0–1.5 mg./kg. w | 0.05–0.1 mg./kg. w | 0.05–0.1 mg./kg. w. |
| Minimum effective dose for increasing rabbit's circulating leukocytes. | 1.0–1.5 mg./kg. w | 0.005–0.01 mg./kg. w | 0.01–0.02 mg./kg. w. |
| Ultracentrifugation | $S_{20w}=3.81\times 10^{-13}$ | $S_{20w}=1.01\times 10^{-13}$ | $S_{20w}=2.3\times 10^{-13}$. |
|  | $D_{20w}=2.84\times 10^{-7}$ | $D_{20w}=7.41\times 10^{-7}$ | $D_{20w}=3.6\times 10^{-13}$. |
| Molecular weight | 132,000 | 15,700 | 62,000. |

What is claimed is:

1. The physiologically active substance active in decreasing the calcium level in blood serum and for increasing the leukocyte number in circulating blood, which has a molecular weight of 62,000, an isoelectric point defined as pH=3.0–3.5, an elementary analysis: C=45.04%; H=6.77%; N=13.15%; and S=0.71%, a constituent amino acid group consisting of glycine, alanine, valine, leucine, phenyl alanine, aspartic acid, glutamic acid, arginine, lysine, histidine, cystine, methionine, serine, threonine, proline, tryptophan and tyrosine, a con- (References on following page)

References Cited in the file of this patent

Ito et al.: Endocrin. Jap. (Tokyo), 6:166–170 and 171–182, September 1959. (Through Cumulated Index Medicus, 1960, Author Index, vol. 1, part 1, 1960, pp. A–602.)

Ito et al.: Endocrin. Jap. (Tokyo), 7:146–152, June 1960. (Through C.I.M., 1960, Author Index, vol. 1, part 1, 1960, pp. A–602.)

Ito et al.: Endocrin. Jap. (Tokyo) 5(4), pp. 277–279, December 1958. (Through Current List of Med. Lit., Subj. Index, vol. 35, June 1959, pp. S–435, col. 1, entry 49240.)

Ito: "Parotin: A Salivary Gland Hormone," Annals N.Y. Acad. Sciences, 85: 228–312, March 29, 1960.

De Chaume: La Presse Medicale, 66:26, pp. 584–586, April 2, 1958.

Pearlman: J. Am. Den. Assn., vol. 48, January 1954, pp. 49–58.